(12) United States Patent
Watkins (10) Patent No.: US 6,454,213 B1
(45) Date of Patent: Sep. 24, 2002

(54) PARACHUTE WITH ENHANCED POCKET BANDS (75) Inventor: John Weber Watkins, Somers, CT (US)

(73) Assignee: Pioneer Aerospace Corporation, South Windsor, CT (US)

(*) Notice: Subject to any disclaimer, the term of this patent is extended or adjusted under 35 U.S.C. 154(b) by 0 days.

(21) Appl. No.: 09/996,852

(22) Filed: Nov. 20, 2001

(51) Int. Cl.[7] .............................................. B64D 17/00
(52) U.S. Cl. ...................................... 244/142; 244/145
(58) Field of Search ................................ 244/142, 145, 244/137.3, 143, 147

(56) References Cited

U.S. PATENT DOCUMENTS

| | | | |
|---|---|---|---|
| 1,509,410 A | 9/1924 | Ruff | 244/142 |
| 1,877,227 A | 9/1932 | Cunningham | 244/145 |
| 1,951,864 A | 3/1934 | Driggs, Jr. | 244/145 |
| 2,404,672 A | 7/1946 | Volf | 244/145 |
| 2,505,954 A | 5/1950 | Frieder et al. | 744/145 |
| 2,511,263 A | 6/1950 | Hiscock | 244/142 |
| 2,525,798 A | 10/1950 | Hattan | 244/142 |
| 2,737,358 A * | 3/1956 | Heinrich | 244/145 |
| 2,974,913 A | 3/1961 | Steinthal | 244/145 |
| 3,013,753 A | 12/1961 | Hughes et al. | 244/142 |
| 3,055,621 A | 9/1962 | Martin | 244/142 |
| 3,099,426 A | 7/1963 | Lemoigne | 244/142 |
| 3,195,842 A | 7/1965 | Wilson | 244/145 |
| 3,393,885 A | 7/1968 | Neumark | 244/142 |
| 3,434,681 A | 3/1969 | Buckelmann | 244/145 |
| 3,452,951 A | 7/1969 | Barish | 244/142 |
| 3,703,268 A | 11/1972 | Pravaz | 244/148 |
| 4,487,384 A | 12/1984 | Astrand | 244/152 |
| 4,586,685 A * | 5/1986 | Kostelezky | 244/145 |
| 4,607,813 A | 8/1986 | Jeswine | 244/145 |
| 4,813,636 A | 3/1989 | Lindgren | 244/152 |
| 4,927,099 A | 5/1990 | Emerson et al. | 244/152 |
| 5,174,527 A | 12/1992 | Kasher | 244/145 |
| 5,360,187 A | 11/1994 | Hengel | 244/145 |
| 5,388,757 A * | 2/1995 | Webb et al. | 244/142 |
| 6,003,815 A * | 12/1999 | Parker et al. | 244/142 |

* cited by examiner

Primary Examiner—J. Woodrow Eldred
(74) Attorney, Agent, or Firm—Sperry, Zoda & Kane (57) ABSTRACT A parachute with enhanced pocket bands positioned adjacent the points of securement of suspension lines and radial lines with respect to the lower edge of the canopy of the parachute wherein the pocket bands are oriented angularly with respect to the radial lines and with respect to the direction of flow during initial inflation of the parachute in order to enhance inflation of air pockets between the pocket bands and the external surface of the canopy adjacent the radial lines in order to more rapidly inflate the canopy of the parachute to facilitate use thereof at lower altitudes and to provide a more controlled canopy inflation. Pocket bands are attached to the lower canopy edge at an angular relation thereto such that the bands catch significantly more air than in the prior art design in order to facilitate inflation of the pocket bands and achieve rapid controlled inflation.

22 Claims, 5 Drawing Sheets

PARACHUTE WITH ENHANCED POCKET BANDS

BACKGROUND OF THE INVENTION

1. Field of the Invention

The present invention deals with the field of parachutes and other aerial descent control mechanisms and, in particular, in regard to designs for the purpose of more rapidly and in a more controlled manner achieving inflation of the canopy of such parachutes. The use of pocket bands positioned attached adjacent at least some of the radial lines between adjacent gores of the canopy have been utilized heretofore. The present invention provides a unique configuration for such pocket bands which orients them angularly with respect to the radial lines and with respect to the movement of air which causes inflation of the canopy in order to enhance lateral movement of the lowermost edge of the canopy to a more rapidly and in a more controlled manner inflate the parachute. This improved configuration for the pocket bands allows more efficient and reliable canopy inflation than with pocket bands utilized heretofore.

2. Description of the Prior Art

Various devices have been designed for the purposes of enhancing initial inflation of a parachute including pocket bands and other devices such as shown in U.S. Pat. No. 1,509,410 patented Sep. 23, 1924 to J. W. Ruff on a "Self-Opening Parachute"; and U.S. Pat. No. 1,877,227 patented Sep. 13, 1932 to W. L. Cunningham on an "Air-Vent Parachute"; and U.S. Pat. No. 1,951,864 patented Mar. 20, 1934 to L. L. Driggs, Jr. and assigned to International Flare-Signal Company on a "Parachute"; and U.S. Pat. No. 2,404,672 patented Jul. 23, 1946 to C. A. Volf on a "Vented Parachute"; and U.S. Pat. No. 2,505,954 patented May 2, 1950 to L. P. Frieder et al and assigned to Reconstruction Finance Corporation on a "Pilot Parachute"; and U.S. Pat. No. 2,511,263 patented Jun. 13, 1950 to E. F. Hiscock on a "Parachute Construction"; and U.S. Pat. No. 2,525,798 patented Oct. 17, 1950 to M. Hattan on a "Shockless Parachute"; and U.S. Pat. No. 2,974,913 patented Mar. 14, 1961 to A. J. Steinthal and assigned to M. Steinthal & Co., Inc. on a "Pilot Chute With Auxiliary Deployment Canopy"; and U.S. Pat. No. 3,013,753 patented Dec. 19, 1961 to C. W. Hughes et al and assigned to Capital Parachuting Enterprises on a "Steerable Parachute"; and U.S. Pat. No. 3,055,621 patented Sep. 25, 1962 to J. Martin on a "Parachute Apparatus"; and U.S. Pat. No. 3,099,426 patented Jul. 30, 1963 to P. M. Lemoigne on a "Parachute"; and U.S. Pat. No. 3,195,842 patented Jul. 20, 1965 to K. R. A. Wilson and assigned to Irving Air Chute Company, Inc. on a "Parachute"; and U.S. Pat. No. 3,393,885 patented Jul. 23, 1968 to O. W. Neumark on "Parachutes"; and U.S. Pat. No. 3,434,681 patented Mar. 25, 1969 to V. G. Bockelmann and assigned to the United States of America as represented by the Secretary of the Navy on a "Parachute Canopy Deflation Apparatus"; and U.S. Pat. No. 3,452,951 patented Jul. 1, 1969 to K. R. A. Wilson and assigned to Irvin Industries, Inc. on a "High Drag Efficiency Parachute Canopy"; and U.S. Pat. No. 3,525,491 patented Aug. 25, 1970 to D. T. Barish and assigned to Barish Associates, Inc. on a "Parachute"; and U.S. Pat. No. 3,703,268 patented Nov. 21, 1972 to M. Pravaz and assigned to Etudes et Fabrications Aeronautiques on a "Parachute Container And The Application Of The Container To A Parachute"; and U.S. Pat. No. 4,487,384 patented Dec. 11, 1984 to H. V. G. Astrand and assigned to Irvin Fallskarms AB on a "Parachute Canopy"; and U.S. Pat. No. 4,607,813 patented Aug. 26, 1986 to W. W. Jeswine and assigned to William W. Jeswine on a "Parachute Assembly"; and U.S. Pat. No. 4,813,636 patented Mar. 21, 1989 to M. J. Lindgren and assigned to Lockheed Missiles & Space Company, Inc. on an "Anti-Fouling Tube For An Inflation-Control Line On A Parachute"; and U.S. Pat. No. 4,927,099 patented May 22, 1990 to R. C. Emerson et al and assigned to DeCel Incorporated on an "Aerodynamic Controllably Vented Pressure Modulating Drogue"; and U.S. Pat. No. 5,174,527 patented Dec. 29, 1992 to A. D. Kasher and assigned to Alliant Techsystems Inc. on an "Annular Spinning Parachute"; and U.S. Pat. No. 5,360,187 patented Nov. 1, 1994 to J. E. Hengel and assigned to The United States of America as represented by the Administrator of the National Aeronautics and Space Administration on a "Parachute Having Improved Vent Line Stacking".

SUMMARY OF THE INVENTION

The present invention provides an enhanced pocket band configuration for use with a parachute in order to control and speed initial inflation thereof. This improved parachute design includes a canopy adapted to be inflated to provide controlled descent for a load attached thereto. The canopy preferably includes an inner surface defining an inflation chamber therein and an outer surface about the exterior area thereof oppositely located from the inner surface.

The canopy further includes a lower edge being generally circular in shape and extending peripherally around the parachute. Preferably, a apex opening or canopy vent is defined by the canopy at the uppermost point or apex thereof.

A plurality of suspension lines are attached to the lower edge of the canopy and extend downwardly therefrom for attachment selectively to a load therebelow. A load attachment device such as risers or the like can be attached to the suspension lines in order for detachably securing a load thereto for providing controlled aerial descent thereof.

A plurality of radial lines extend along the canopy from the apex opening or canopy vent to the lower edge thereof. Usually these radial lines are attached to the lower canopy edge at locations where suspension lines also extend downwardly therefrom. The radial lines are attached along the length thereof to the adjacent surface of the canopy. A plurality of gores are defined in the canopy adjacent the lower edge thereof between each pair of the radial lines.

The upper ends of the radial lines terminate at the lowermost edge of the apex opening. Vent lines extend across the apex opening from the lowermost edge thereof. To facilitate distribution of forces, it is preferred than these vent lines be freely movable relative to one another, thus normally they are not secured to one another as they cross over one another in the apex opening area.

A pocket band is attached preferably to the outer surface of the canopy at every gore, or, in some configurations, at every other gore. The means of securement can be by any conventional manner such as adhesives or by being sewn in place to the adjacent members or surfaces. Each of these pocket bands preferably includes a first end fixedly secured to the outer surface of the canopy adjacent one of the gores at an acute angle relative to the radial line secured thereto. The pocket band further also preferably includes a second end fixedly secured by adhesive or being sewn to the outer surface of the canopy adjacent the gore and spatially disposed from the first end and the second end and secured to the canopy preferably at an acute angle relative to the radial line secured at that point.

A central band section of the pocket band is included which can be formed with a width of any reasonable dimension which should be proportional to the parachute diameter. A width of approximately two inches has been found to be preferred for most moderate sized parachutes. This central band section is secured at one end to the first end means and at the other end to the second end means and is not attached in any manner with respect to the canopy such that it is freely movable away from the canopy to enhance forming of an inflation pocket therebetween. The first end and the central band section and the second end of each of the pocket bands can preferably comprise a single integral member of any flexible material, however usually they will be formed of a woven fabric. The central band section is defined to extend between the first end and the second end across an adjacent radial line therebetween and be oriented angularly with respect thereto.

The central band section is preferably movable away from the gore of the canopy to be oriented at an angle extending downwardly and outwardly relative to the radial line thereadjacent in order to facilitate defining of an inflation pocket therebetween. This inflation pocket is designed to receive air moving thereinto during initial inflation of the canopy to facilitate initial deployment thereof. The inflation pocket is adapted to be inflated during the initial inflation of the canopy in such a manner as to urge outward movement of the lower edge of the canopy in order to aid initial inflation thereof. The central band is positioned angularly with respect to the radial line thereadjacent in order to increase the surface area of the central band section oriented perpendicularly to the direction of flow of inflating air during initial inflation of the canopy in order to facilitate defining of the inflation pocket adjacent the gores for more rapidly expanding of the canopy to achieve controlled initial deployment thereof.

The central band section of the pocket band may preferably also include an upper band segment extending between the first end means and the second end means as well as a lower band section also extending between the first and second end means. The lower band segment is preferably of a greater length than the upper band segment in order to allow the central band section to be oriented angularly with respect to the relative direction of movement of air during initial inflation of the canopy. The upper band segment and the lower band segment are preferably formed as a single integral member of woven fabric or other flexible material.

With this construction the central band will preferably be generally of a trapezoidal shape and define a first parallel side and a second parallel side each being parallel with respect to one another with the second parallel side being longer than the first parallel side to facilitate defining of the trapezoidal shape. The first parallel side is preferably positioned on the upper band segment and the second parallel side is positioned on the lower band segment to allow outward flaring of the lower band segment relative to the upper band segment to facilitate defining of an inflation pocket adjacent the lower edge of the canopy for the purposes defined above.

First angular stitching is preferably included for attaching of the first end to the canopy at an acute angle relative to the radial line thereadjacent to facilitate orienting of the central band section angularly relative to the movement of the inflating air. This configuration is for the purpose of urging inflation of the inflation pocket thereadjacent during initial inflation of the canopy. The first angular stitching will preferably include a first inner stitching seam immediately adjacent the central band section and basically forming the interface between the central band section and the first end. In this manner the first inner stitching member will facilitate orientation of the central band section relative to the radial lines at an angle in order to increase the lifting force vector thereon resulting from air movement relatively parallel to the radial lines during initial inflation of the canopy and prior to full inflation thereof.

In a similar manner, a second angular stitching will preferably be included for attaching the second end to the canopy at an acute angle relative to the radial lines to facilitate orienting of the central band section angularly relative to the movement of inflating air in order to urge inflation of the pocket thereadjacent. The second angular stitching preferably includes a second inner stitching seam immediately adjacent the central band section to facilitate orientation thereof angularly relative to the radial lines to increase the lifting force vector thereon resulting from air movement relatively parallel to the suspension lines during initial inflation of the canopy and prior to full inflation thereof. For stability, it is preferable that the pocket band and the angular attachment, which may comprise stitching, forming the pocket band be oriented symmetrically about the adjacent radial line, when viewing radially inwardly thereon.

It is an object of the present invention to provide a parachute with enhanced pocket bands to facilitate controlled initial inflation thereof wherein inflation pockets are more easily formed at each parachute gore to facilitate canopy inflation.

It is an object of the present invention to provide a parachute with enhanced pocket bands to facilitate controlled initial inflation thereof wherein conventional parachute materials can be utilized.

It is an object of the present invention to provide a parachute with enhanced pocket bands to facilitate controlled initial inflation thereof wherein the bands themselves can be secured to the canopy of the parachute by conventional attachment methods such as using adhesives or utilizing stitching to achieve an enhanced unique configuration.

It is an object of the present invention to provide a parachute with enhanced pocket bands to facilitate controlled initial inflation thereof wherein the reliability of operation of the pocket bands is significantly improved.

It is an object of the present invention to provide a parachute with enhanced pocket bands to facilitate controlled initial inflation thereof wherein the skirt diameter of the canopy is restricted as with conventional pocket bands to increase effectiveness of the extended skirt.

It is an object of the present invention to provide a parachute with enhanced pocket bands to facilitate controlled initial inflation thereof wherein initial inflation of the canopy of the parachute is more consistent and uniform.

It is an object of the present invention to provide a parachute with enhanced pocket bands to facilitate controlled initial inflation thereof wherein use with any number of gores or suspension lines is made possible.

It is an object of the present invention to provide a parachute with enhanced pocket bands to facilitate controlled initial inflation thereof wherein use with different configurations of canopies is possible.

It is an object of the present invention to provide a parachute with enhanced pocket bands to facilitate controlled initial inflation thereof wherein the amount of air intersecting the pocket band during initial inflation is significantly increased.

It is an object of the present invention to provide a parachute with enhanced pocket bands to facilitate controlled initial inflation thereof wherein the cross sectional area of the pocket band perpendicular to the relative direction of movement during inflation of the canopy is significantly increased.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a parachute 10 with a canopy 12 which is generally circular. Canopy 12 defines an inner surface 14 which defines an inflation chamber 18 therein and an outer surface 16 oppositely positioned from the inner surface 14.

A lower edge 20 is defined along the bottommost area of canopy 12 and a plurality of radial lines 23 are secured to the canopy 12. Radial lines 23 extend from apex opening or canopy vent 13 to the lower edge 20 and define gores 24 therebetween. Suspension lines 22 are attached to radial lines 23 and extend past the lower edge 20 of the canopy. A load attachment means 26 which can comprise risers can preferably be located therebelow and be attached to the lower portion of suspension lines 22. Load attachment means or risers 26 can be detachably securable to a load 27 for providing controlled aerial descent thereof. Use of the load attachment means 26 is optional since the suspension lines 22 can be secured directly to a load 27 under in certain applications of the parachute system of the present invention.

The canopy 12 includes the plurality of radial lines 23 extending from the canopy vent or apex opening 13 to the lower edge 20 thereof. A vent 13 can be located in canopy 12 in the areas of the apex 19 or uppermost location thereon. A plurality of gores 24 are included each located between adjacently positioned radial lines 23 and extending therebetween. Suspension lines 22 are attached to each radial line 23 at the canopy lower edge 20 and extend downwardly therefrom. The individual radial lines 23 and the specifically associated suspension line 22 can each be constructed as a single integral line in some parachute designs without affecting the function of the present invention.

In the preferred configuration of the present invention a pocket band 28 is secured by adhesive or stitching to the outer surface 16 of the canopy 12 of the present invention in such a manner as to extend over the radial line 23 secured thereadjacent. This pocket band 28 preferably includes a first end 30 secured to the outer surface 16 of the canopy 12 and a second end 32 secured to the outer surface 16 of the canopy 12 on the opposite side of the radial line 23 from the first end 30. Thus, with first end 30 secured to the canopy 12 on one side of the radial line 23 and the second end 32 secured on the opposite side thereof, the pocket band 28 will extend across radial line 23 secured to the lower edge 20 of canopy 12.

The first end 30 and the second end 32 of the pocket band 28 of the present invention are connected with respect to one another by a central band section 34. It is this central band section 34 which extends from the gore 24 on one side of the radial line 23 to the adjacent gore 24 on the other side thereof. In this invention the central band section 34 will be oriented vertically at an angle relative to the radial lines 23 and with respect to the canopy 12. This angular orientation is for the purpose of having the central band section 34 provide a greater cross section of wind resistance which is impinged upon by the relative upward movement of air with respect thereto during inflation.

Figure 1:
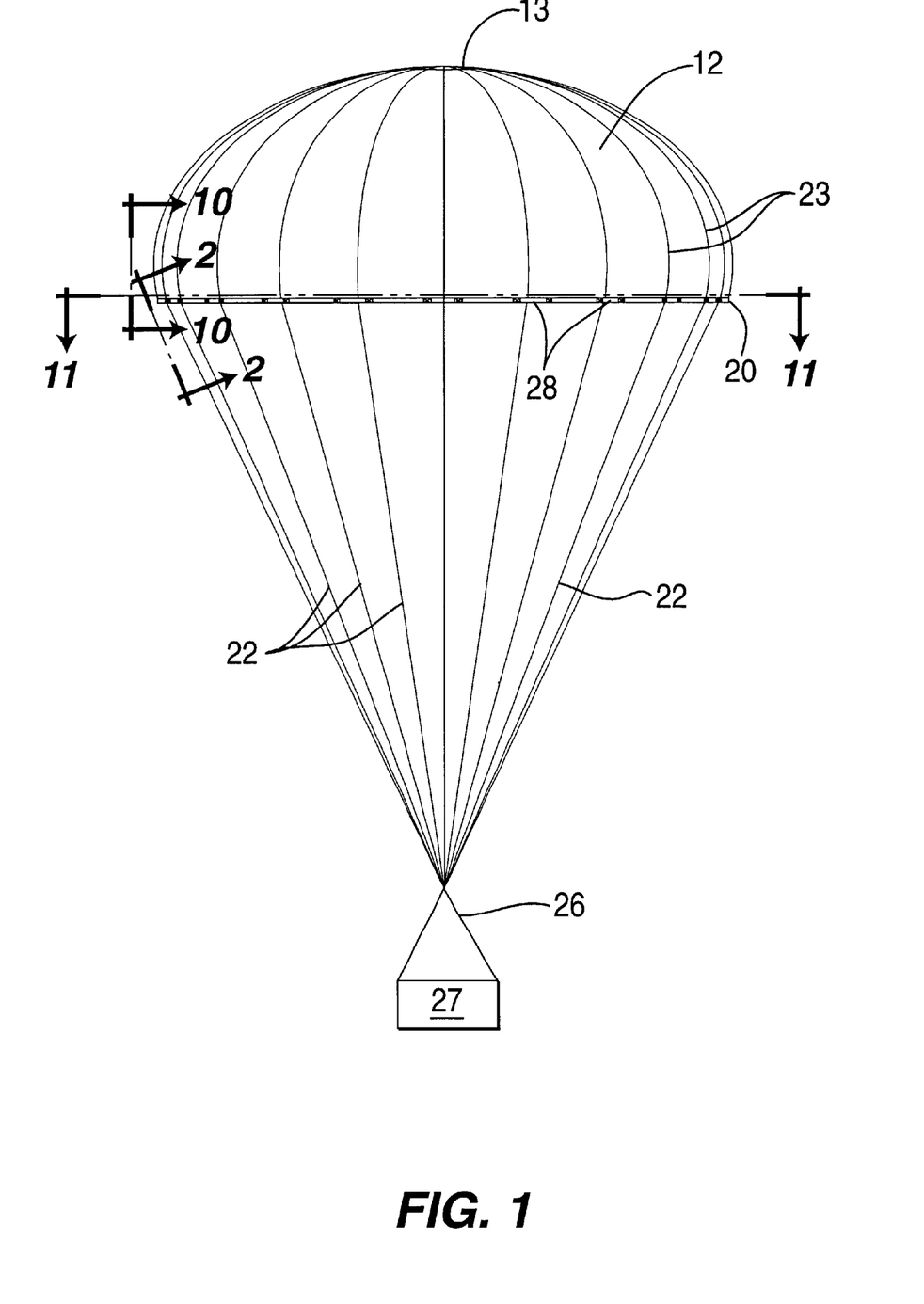
FIG. 1 is a side view of an embodiment of the parachute of the present invention shown with the canopy thereof fully inflated.
Figures 2, 3, 4, 5:
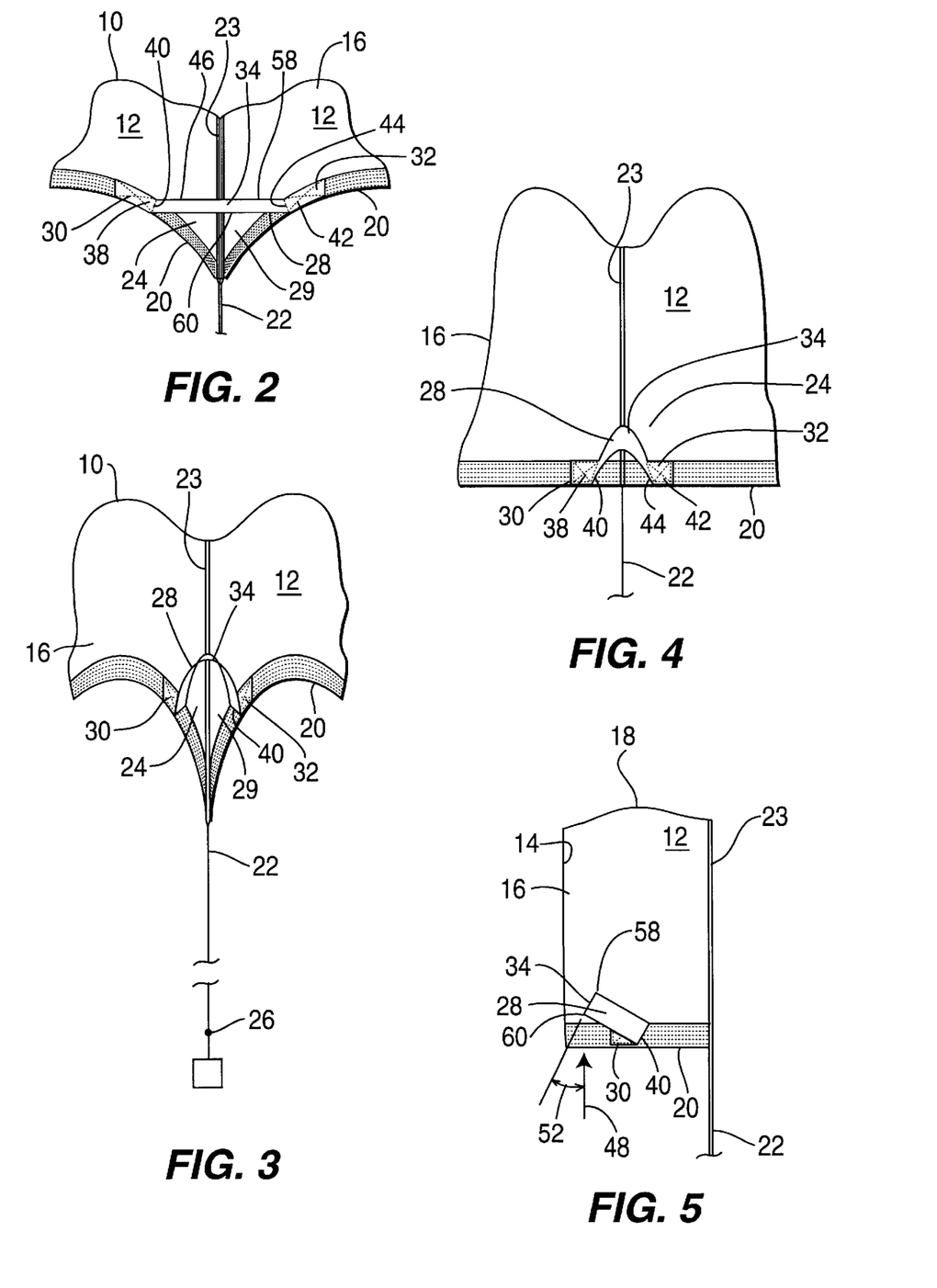
FIG. 2 is a perspective illustration of an embodiment of the pocket band of the inflated parachute of the present invention showing an enhanced pocket band configuration taken along lines 2—2 of FIG. 1.
FIG. 3 is a perspective illustration of the embodiment shown in FIG. 2 with the central band section of the pocket band moved away from the lower outer surface of the partially inflated canopy in order to define an inflation pocket therebetween.
FIG. 4 is a side plan view of an embodiment of the present invention with a partially inflated canopy showing the pocket band spaced from the lower edge of the canopy.
FIG. 5 is a side view of an embodiment of the present invention with a partially inflated canopy showing an inflated pocket band adjacent a gore.
Figures 6, 7, 8:
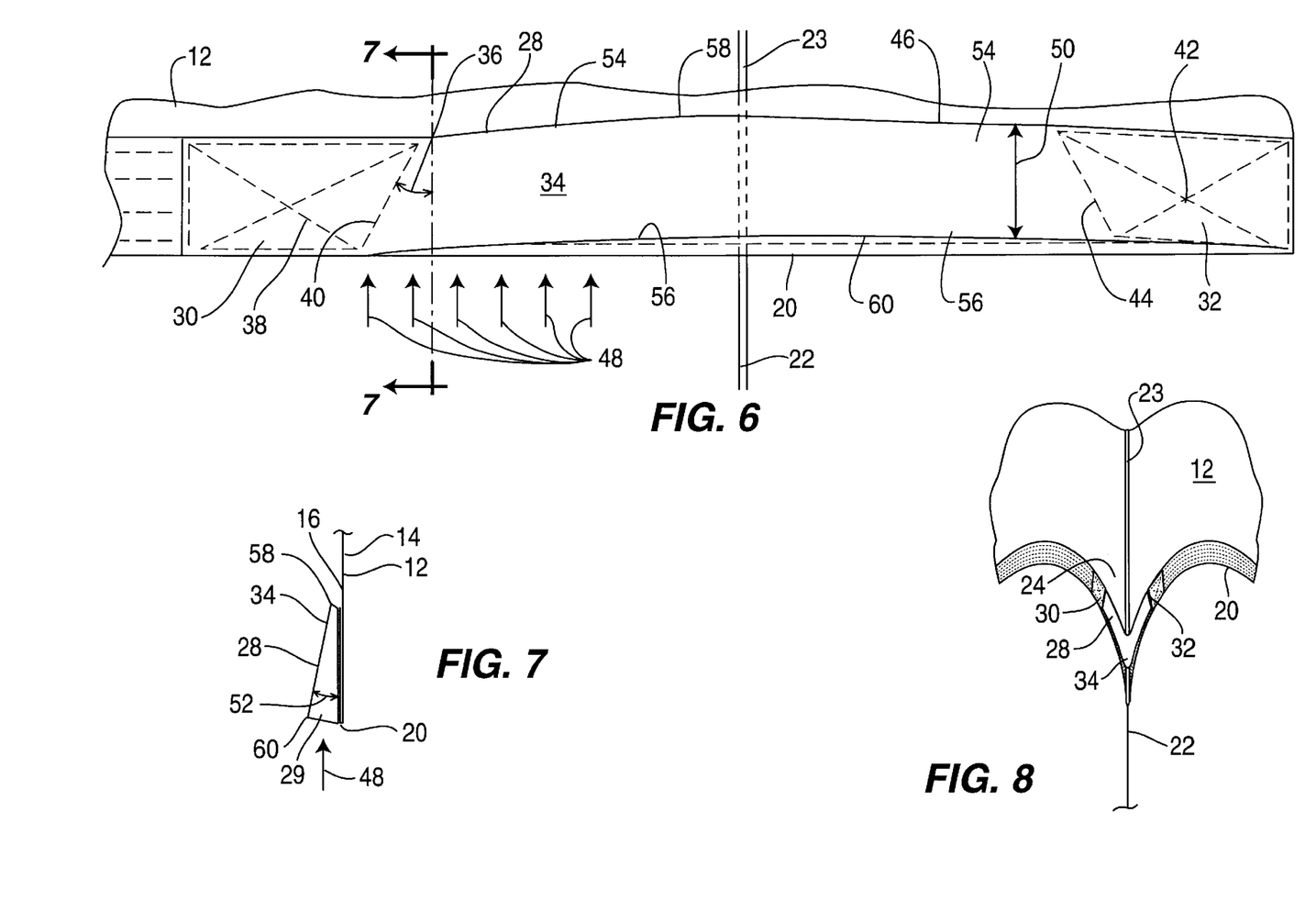
FIG. 6 is an exploded front plan view of an embodiment of a pocket band of the present invention showing attachment to a canopy.
FIG. 7 is a schematic illustration showing the operation of the pocket band of the present invention shown in relation to the canopy skirt and in relation to the relative air flow thereagainst during initial inflation.
FIG. 8 is an illustration of the embodiment shown in FIG. 2 with the pocket band moved to the non-operating position in abutment with the outer surface of the canopy.
Figure 9:
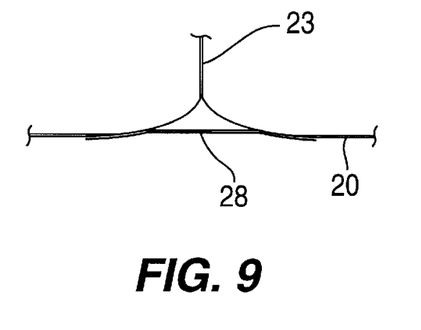
FIG. 9 is a cross-sectional view of FIG. 10 taken along line 9—9.
Figure 10:
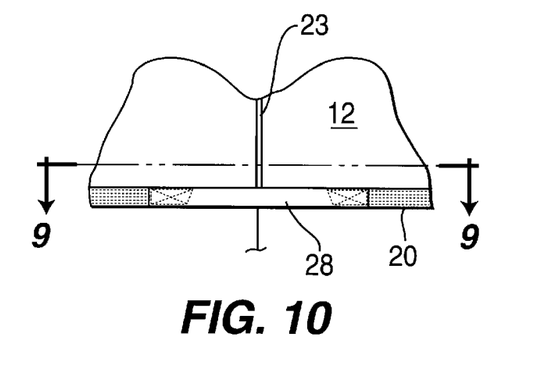
FIG. 10 is a cross-sectional view of FIG. 1 taken along lines 10—10.
Figure 11:
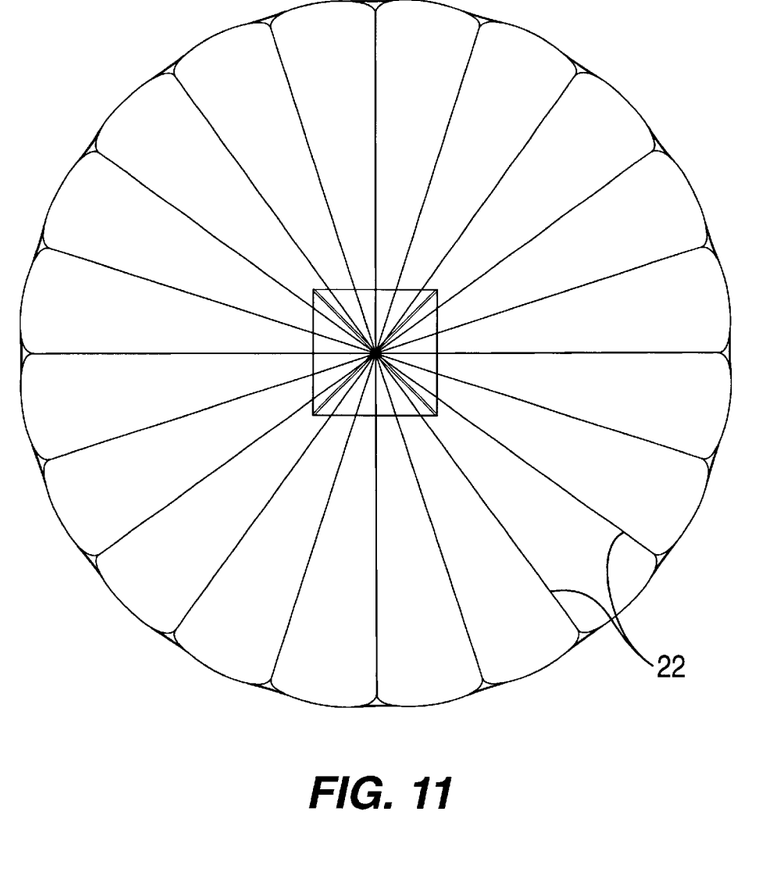
FIG. 11 is a cross-sectional view of FIG. 1 taken along lines 11—11.
Figure 12:
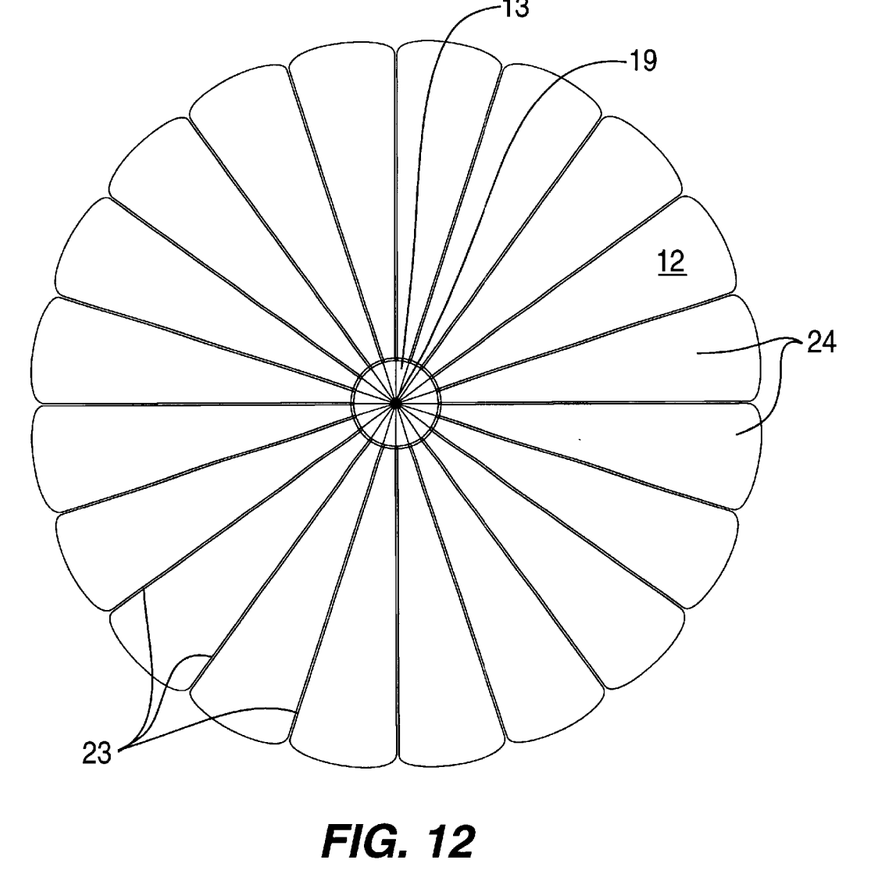
FIG. 12 is a illustration of an embodiment of the present invention taken from above the canopy with the pocket bands removed to show the vent means for purposes of illustration only.

As best shown in FIGS. 6 and 7, air will force the pocket band 28 away from the lower edge 20 of canopy 12 when the pocket band 28 is in close proximity to the lower edge 20 during the initial stages of inflation. At this point, the aerodynamic forces are helping to move the pocket band 28 away from close contact with the lower edge 20 of canopy 12 so that the pocket band 28 will assume the orientation shown in FIGS. 3,4, and 5, and still later, will assume the orientation shown in FIG. 2 after the canopy becomes fully inflated. The angle of the adhesive attachment or stitching 38 and 42 will help to orient the pocket band 28 as shown in FIG. 3, thus avoiding the undesirable orientation shown in FIG. 8. For the purpose of this preferred embodiment only, stitching 38 and 42 will be described as the means of attachment of the pocket bands 28 to the adjacent surface but attachment utilizing standard adhesives used in this field of art is also within contemplation of the present invention. As a result of this geometry when the pocket band 28 is in close proximity to the lower edge 20 as shown in FIG. 8, the aerodynamic forces are not effective in moving the canopy 12 radially outwardly for encouraging full inflation thereof. As the pocket bands 28 move as shown in FIGS. 4, 5 and 6, they will be stretching outwardly due to the aerodynamic forces. Tension will then be applied to canopy 12 by pocket bands 28 thereby urging the lower edge 20 of canopy 12 to move radially outwardly. The angled stitching 38 and 42 serves to promote this specific function of each pocket band 28.

In order to angularly orient the pocket band 28 and, in particular, the central band section 34 thereof relative to the canopy 12 and the radial lines 23 and the relative air direction movement 48, a first angular stitching 38 is utilized. The configuration of this stitching is shown best in FIG. 6 and makes use of a first inner stitching seam 40 at the intersection between the central band section 34 and the first end 30. In a similar manner a second angular stitching 42 is utilized at the second end 32 for securement thereof with respect to the canopy 12 and utilizes a second inner stitching seam 44 angularly oriented relative to the lower edge 20 of the canopy 12 in order to encourage movement of the central band section 34 away from abutment with the lower edge 20 of the canopy 12 to facilitate defining of the inflation pocket 29 relative to the outer surface 16 of canopy 12.

With this stitching configuration of the first inner stitching seam 40 and second inner stitching seam 44, the central band section 34 will be formed in the general shape of a trapezoid 46. This trapezoidal shape 46 will include a first parallel side 58 along the upper band segment 54 of the central band section 34. In a similar manner the trapezoidal shape 46 will dictate the lower band segment 56 of the central band section 34 to define a second parallel side 60. First parallel side 58 will be smaller than second parallel side 60 thereby causing an angle 36 to be created between the adjacent radial line 23 and the inner stitching seams 40 and 44. This configuration for the pocket band 28 will encourage the lower band segment 56 of the trapezoidal shaped central band section 34 to flare outwardly and assume an acute angle 52 in relation to the relative direction of movement of air shown by arrows 48 to enhance the possibility of immediate full inflation of an inflation pocket 29 adjacent each of the gores 24.

The vertical or lateral dimension of the pocket band is critical because it is this dimension which determines the cross sectional area against which the relative air flow 48 will contact. The width or vertical height 50 of the pocket band 28 is preferably approximately two inches. The width of the band 28 can be much wider than two inches for larger canopy diameters and can be much narrower for smaller ones. However, the relationship between canopy size and the width of band 28 is an important aspect of the present invention.

Figure 13:
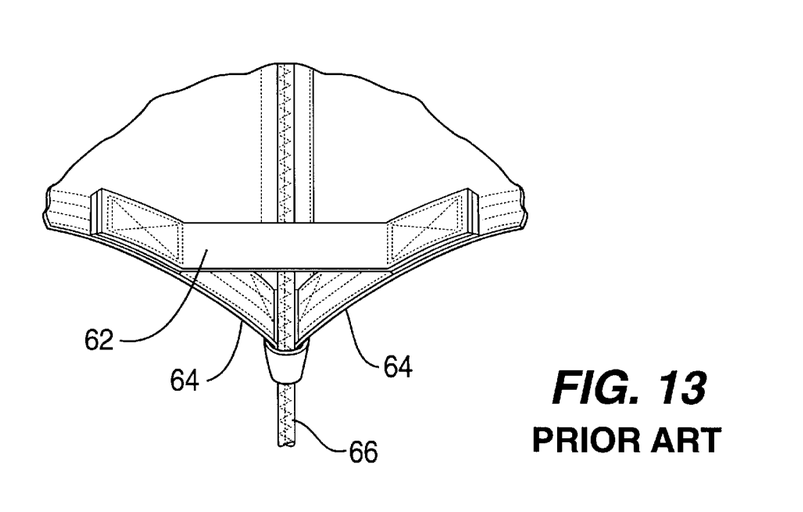
FIG. 13 is an illustration of a prior art pocket band shown with the pocket bands attached to the outer surface of the canopy at a gore thereon with the attachment means oriented parallel to the incoming air and the suspension lines thereadjacent.

A prior art configuration is shown in FIG. 13 wherein the prior art pocket band 62 is shown along a prior art lower canopy edge 64 adjacent a prior art suspension line 66. With this configuration it can be seen that the inner seam of the stitching on each end of the pocket band is parallel with respect to one another and parallel to the radial lines and the direction of movement of air during initial inflation thereof. Also, this stitching, which is perpendicular to the lower edge of the canopy, defines a central band section of the pocket band which is rectangular in shape rather than trapezoidal and thereby is not oriented angularly with respect to the radial lines as in the present invention. For this reason the present invention is a distinct improvement thereover for the reasons described above regarding the advantages of the angular relationship of the central band section 34 relative to the direction 48 of relative inflating air movement.

In summary, the angled stitch pattern of the present invention orients the pocket band in such a manner as to be angularly oriented relative to the radial lines defining the canopy profile. The pattern also provides this angular relationship relative to the canopy skirt and, most importantly, relative to the air flow during initial stages of inflation. This angular orientation generates a lift component that will force the canopy skirt outwardly in order to more rapidly and reliably inflating the canopy skirt. This is achieved by the force exerted on each pocket band outwardly and away from the canopy which allows the pocket band to have a propensity to assume the configuration shown in FIG. 3 much more often than assuming the collapsed configuration shown in FIG. 8.

As shown in the figures, the detailed structure of the apparatus of the present invention includes radial lines 23 which are the structural members that transfer loads from suspension lines 22 into the canopy 12. Radial lines 23 are secured to the fabric portion of canopy 12, and generally extend from the lower edge 20 thereof to vent 13. The band extending about the edge of the vent is the member in combination with the overall canopy configuration and the radial lines together distribute the load along the desired paths. It should be appreciated that in accordance with the present invention, it is contemplated that the radial lines 23 the suspension lines may be separate elements or may each comprise a single integral member or continuous line. Each gore 24 is separated from an adjacent gore 24 by a radial line 23. The lowermost section of a gore 24 is defined by canopy lower edge 20.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A parachute with enhanced pocket bands to facilitate controlled initial inflation thereof comprising:

A. a canopy means adapted to be inflated to provide controlled descent for a load attached thereto, said canopy means including an inner surface defining an inflation chamber means therewithin, said canopy means also including an outer surface, said canopy means further including a lower edge means extending peripherally therearound, said canopy means defining a canopy vent at the uppermost location thereon;

B. a plurality of suspension lines each attached to said canopy means and extending downwardly from said lower edge means thereof for attachment selectively to a load therebelow;

C. a plurality of radial lines extending from said canopy vent to said lower edge means spaced apart from one another and attached to said canopy means therealong, each of said radial lines being connected with respect to a suspension line extending downwardly therefrom;

D. a plurality of gores defined on said canopy means between adjacent pairs of said radial lines and said lower edge means thereof; and E. a plurality of pocket bands each attached to said canopy means and extending across at least some of said radial lines therebetween along said lower edge means thereof, each of said pocket bands comprising:

(1) a first end means secured to one of said gores of said canopy means adjacent said lower edge means thereof at an angle relative to said radial line thereadjacent to enhance inflation of said pocket bands for facilitating inflation of said canopy means;

(2) a second end means secured to an adjacent said gore, said second end means being secured to said lower edge means at an angle relative to said radial line secured thereadjacent to enhance inflation of said pocket bands for facilitating inflation of said canopy means;

(3) a central band section secured to said first end means and said second end means and extending therebetween across said radial line located therebetween and oriented angularly with respect thereto, said central band section being movable outwardly away from said lower edge means of said canopy means to be oriented at an angle extending downwardly and outwardly relative to said radial line thereadjacent to facilitate defining of an inflation pocket therebetween to receive air moving thereinto during initial inflation of said canopy means, said inflation pocket adapted to be inflated during initial inflation of said canopy means to urge outward movement of said lower edge means of said canopy means to facilitate initial inflation thereof, said central band section being positioned angularly with respect to said radial line thereadjacent in order to increase the surface area of said central band section oriented perpendicularly relative to the direction of flow of inflating air during initial inflation of said canopy means in order to facilitate defining of said inflation pocket adjacent said gores for more rapidly expanding the canopy means to achieve controlled initial inflation thereof.

2. A parachute with enhanced pocket bands to facilitate controlled initial inflation thereof as defined in claim 1 wherein said lower edge means of said canopy means is generally circular in shape.

3. A parachute with enhanced pocket bands to facilitate controlled initial inflation thereof as defined in claim 1 wherein said plurality of gores are defined on said canopy means adjacent said lower edge means thereof adjacent each of said radial lines.

4. A parachute with enhanced pocket bands to facilitate controlled initial inflation thereof as defined in claim 1 wherein said central band section is approximately two inches wide.

5. A parachute with enhanced pocket bands to facilitate controlled initial inflation thereof as defined in claim 1 wherein said first end means is secured to said canopy means adjacent said lower edge means thereof at an acute angle relative to said radial line thereadjacent to facilitate separation between said central band section and said canopy means to facilitate forming of an inflation pocket therebetween during initial inflation thereof.

6. A parachute with enhanced pocket bands to facilitate controlled initial inflation thereof as defined in claim 1 wherein said second end means is secured to said canopy means adjacent said lower edge means thereof at an acute angle relative to said radial line thereadjacent to facilitate separation between said central band section and said canopy means to facilitate forming of an inflation pocket therebetween during initial inflation thereof.

7. A parachute with enhanced pocket bands to facilitate controlled initial inflation thereof as defined in claim 1 wherein said first end and said second end of said pocket bands are attached to said outer surface of said canopy means.

8. A parachute with enhanced pocket bands to facilitate controlled initial inflation thereof as defined in claim 1 further comprising first angular stitching for attaching of said first end means to one of said gores of said canopy means at an acute angle relative to said radial lines to facilitate orienting of said central band section angularly relative to the movement of inflating air to urge inflation of said inflation pocket thereadjacent during initial inflation of said canopy means.

9. A parachute with enhanced pocket bands to facilitate controlled initial inflation thereof as defined in claim 8 wherein said first angular stitching includes a first inner stitching seam immediately adjacent said central band section to facilitate orientation thereof angularly relative to said radial lines to increase the lifting force vector thereon resulting from air movement relatively parallel to said radial lines during initial inflation of said canopy means and prior to full inflation thereof.

10. A parachute with enhanced pocket bands to facilitate controlled initial inflation thereof as defined in claim 1 further comprising second angular stitching for attaching of said second end means to said canopy means at an acute angle relative to said radial lines to facilitate orienting of said central band section angularly relative to the movement of inflating air to urge inflation of said inflation pocket thereadjacent during initial inflation of said canopy means.

11. A parachute with enhanced pocket bands to facilitate controlled initial inflation thereof as defined in claim 10 wherein said second angular stitching includes a second inner stitching seam immediately adjacent said central band section to facilitate orientation thereof angularly relative to said radial lines to increase the lifting force vector thereon resulting from air movement relatively parallel to said suspension lines during initial inflation of said canopy means and prior to full inflation thereof.

12. A parachute with enhanced pocket bands to facilitate controlled initial inflation thereof as defined in claim 1 wherein said first end means, said central band section and said second end means of each of said pocket bands comprises a single integral member of woven fabric.

13. A parachute with enhanced pocket bands to facilitate controlled initial inflation thereof as defined in claim 1 wherein said pocket bands are oriented extending horizontally parallel with respect to said lower edge means of said canopy means.

14. A parachute with enhanced pocket bands to facilitate controlled initial inflation thereof as defined in claim 1 wherein first end means and said second end means are fixedly secured to adjacent of said gores of said canopy means and wherein said central band means is free from any attachment thereto to allow outwardly movement thereof relative to said lower edge means of said canopy means to facilitate defining of an inflation pocket therebetween.

15. A parachute with enhanced pocket bands to facilitate controlled initial inflation thereof as defined in claim 1 wherein said central band section includes:

A. an upper band segment extending between said first end means and said second end means; and B. a lower band segment also extending between said first end means and said second end means, said lower band segment being of greater length than said upper band segment in order to allow said central band section to be oriented angularly with respect to the relative direction of movement of air during initial inflation of said canopy means.

16. A parachute with enhanced pocket bands to facilitate controlled initial inflation thereof as defined in claim 15 wherein said upper band segment and said lower band segment are formed of a single integral member of woven fabric.

17. A parachute with enhanced pocket bands to facilitate controlled initial inflation thereof as defined in claim 15 wherein said central band section of said pocket band is trapezoidal in shape in order to enhance outwardly flaring of said lower band segment thereof to facilitate forming of an inflation pocket between said central band section and said lower edge means of said canopy means thereadjacent during initial inflation of said canopy means.

18. A parachute with enhanced pocket bands to facilitate controlled initial inflation thereof as defined in claim 17 wherein said central band being of a trapezoidal shape defines a first parallel side and a second parallel side each being parallel with respect to one another with said second parallel side being longer than said first parallel side, said first parallel side being positioned on said upper band segment and said second parallel side being positioned on said lower band segment to enhance outwardly flaring of said lower band segment relative to said upper band segment to facilitate defining of an inflation pocket adjacent said lower edge means of said canopy means during initial inflation thereof.

19. A parachute with enhanced pocket bands to facilitate controlled initial inflation thereof as defined in claim 1 further comprising a load attachment means attached to said suspension lines and detachably securable to a load for providing controlled aerial descent thereof.

20. A parachute with enhanced pocket bands to facilitate controlled initial inflation thereof as defined in claim 1 wherein one of said pocket bands is positioned extending across each of said radial lines.

21. A parachute with enhanced pocket bands to facilitate controlled initial inflation thereof comprising:
   A. a canopy means adapted to be inflated to provide controlled descent for a load attached thereto, said canopy means including an inner surface defining an inflation chamber means therewithin, said canopy means also including an outer surface, said canopy means further including a lower edge means extending peripherally therearound, said canopy means defining a canopy vent at the uppermost location thereon;
   B. a plurality of suspension lines each attached to said canopy means and extending downwardly from said lower edge means thereof for attachment selectively to a load therebelow;
   C. a plurality of radial lines extending from said canopy vent to said lower edge means spaced apart from one another and attached to said canopy means therealong, each of said radial lines being connected with respect to a suspension line extending downwardly therefrom;
   D. a plurality of gores defined on said canopy means between adjacent pairs of said radial lines and said lower edge means of said canopy means;
   E. a load attachment means attached to said suspension lines and detachably securable to a load for providing controlled aerial descent thereof;
   F. a plurality of pocket bands attached to said canopy means between adjacent said gores thereof, each of said pocket bands comprising:
      (1) a first end means fixedly secured to said outer surface of said canopy means at an acute angle relative to said radial line thereadjacent to enhance inflation of said pocket bands for facilitating inflation of said canopy means;
      (2) a second end means fixedly secured to said outer surface of said canopy means spatially disposed from said first end means, said second end means being secured to said canopy means at an acute angle relative to said radial line thereadjacent to enhance inflation of said pocket bands for facilitating inflation of said canopy means;
      (3) a central band section secured to said first end means and said second end means free from any attachment to said canopy means, said central band section extending between said first end means and said second end means across said radial line thereadjacent and oriented angularly with respect thereto, said central band section being movable outwardly away from said lower edge means of said canopy means to be oriented at an angle extending downwardly and outwardly relative to said radial line thereadjacent to facilitate defining of an inflation pocket therebetween to receive air moving thereinto during initial inflation of said canopy means, said inflation pocket adapted to be inflated during initial inflation of said canopy means to urge outward movement of said lower edge means of said canopy means to facilitate initial inflation thereof, said central band section being positioned angularly with respect to said radial line thereadjacent in order to increase the surface area of said central band section oriented perpendicularly to the direction of flow of inflating air during initial inflation of said canopy means in order to facilitate defining of said inflation pocket adjacent said canopy means for more rapidly expanding thereof to achieve controlled initial deployment thereof, said central band section of said pocket band including:
         (a) an upper band segment extending between said first end means and said second end means; and
         (b) a lower band segment also extending between said first end means and said second end means, said lower band segment being of greater length than said upper band segment in order to allow said central band section to be oriented angularly with respect to the relative direction of movement of air during initial inflation of said canopy means, said upper band segment and said lower band segment being formed of a single integral member of woven fabric, said central band being of a trapezoidal shape and defining a first parallel side and a second parallel side each being parallel with respect to one another with said second parallel side being longer than said first parallel side, said first parallel side being positioned on said upper band segment and said second parallel side being positioned on said lower band segment to enhance outwardly flaring of said lower band segment relative to said upper band segment to facilitate defining of an inflation pocket adjacent said lower edge of said canopy means during initial inflation thereof.

22. A parachute with enhanced pocket bands to facilitate controlled initial inflation thereof comprising:
   A. a canopy means adapted to be inflated to provide controlled descent for a load attached thereto, said canopy means including an inner surface defining an inflation chamber means therewithin, said canopy means also including an outer surface, said canopy means further including a lower edge means being circular in shape and extending peripherally therearound, said canopy means further defining a canopy vent at the uppermost location thereon;

B. a plurality of suspension lines each attached to said canopy means and extending downwardly from said lower edge means thereof for attachment selectively to a load therebelow;

C. a plurality of radial lines extending from said canopy vent to said lower edge means spaced apart from one another and attached to said canopy means therealong, each of said radial lines being connected with respect to a suspension line extending downwardly therefrom;

D. a plurality of gores defined on said canopy means between adjacent pairs of said radial lines and said lower edge means;

E. a load attachment means attached to said suspension lines and detachably securable to a load for providing controlled aerial descent thereof;

F. a plurality of pocket bands attached to adjacent pairs of said gores extending across said radial line located therebetween, each of said pocket bands comprising:
   (1) a first end means fixedly secured to said outer surface of said canopy means adjacent one of said suspension lines at an acute angle relative thereto;
   (2) a second end means fixedly secured to said outer surface of said canopy means adjacent one of said suspension lines at an acute angle relative thereto, said second end means being spatially disposed from said first end means;
   (3) a central band section being approximately two inches in width and secured to said first end means and said second end means free from any attachment to said canopy means, said first end means and said central band section and said second end means of each of said pocket bands comprising a single integral member of woven fabric, said central band section extending between said first end means and said second end means across said radial line thereadjacent and oriented angularly with respect thereto, said central band section being movable outwardly away from said canopy means to be oriented at an angle extending downwardly and outwardly relative to said radial line thereadjacent to facilitate defining of an inflation pocket therebetween to receive air moving thereinto during initial inflation of said canopy means, said inflation pocket adapted to be inflated during initial inflation of said canopy means to urge outward movement of said lower edge means of said canopy means to facilitate initial inflation thereof, said central band section being positioned angularly with respect to said radial line thereadjacent in order to increase the surface area of said central band section oriented perpendicularly to the direction of flow of inflating air during initial inflation of said canopy means in order to facilitate defining of said inflation pocket adjacent said lower edge means of said canopy means for more rapidly expanding the canopy means to achieve controlled initial deployment thereof, said central band section of said pocket band including:
   (a) an upper band segment extending between said first end means and said second end means;
   (b) a lower band segment also extending between said first end means and said second end means, said lower band segment being of greater length than said upper band segment in order to allow said central band section to be oriented angularly with respect to the relative direction of movement of air during initial inflation of said canopy means, said upper band segment and said lower band segment being formed of a single integral member of woven fabric, said central band being of a trapezoidal shape and defining a first parallel side and a second parallel side each being parallel with respect to one another with said second parallel side being longer than said first parallel side, said first parallel side being positioned on said upper band segment and said second parallel side being positioned on said lower band segment to enhance outwardly flaring of said lower band segment relative to said upper band segment to facilitate defining of an inflation pocket during initial inflation adjacent said radial line attached to said canopy means;

G. a first angular stitching for attaching of said first end means to said canopy means at an acute angle relative to said radial lines to facilitate orienting of said central band section angularly relative to the movement of inflating air to urge inflation of said inflation pocket thereadjacent during initial inflation of said canopy means, said first angular stitching includes a first inner stitching seam immediately adjacent said central band section to facilitate orientation thereof angularly relative to said radial lines to increase the lifting force vector thereon resulting from air movement relatively parallel to said suspension lines during initial inflation of said canopy means and prior to full inflation thereof; and H. a second angular stitching for attaching of said second end means to said canopy means at an acute angle relative to said radial lines to facilitate orienting of said central band section angularly relative to the movement of inflating air to urge inflation of said inflation pocket thereadjacent during initial inflation of said canopy means, said second angular stitching includes a second inner stitching seam immediately adjacent said central band section to facilitate orientation thereof angularly relative to said radial lines to increase the lifting force vector thereon resulting from air movement relatively parallel to said radial lines during initial inflation of said canopy means and prior to full inflation thereof.

* * * * *